United States Patent
Joshi et al.

(10) Patent No.: US 9,390,156 B2
(45) Date of Patent: Jul. 12, 2016

(54) DISTRIBUTED DIRECTORY ENVIRONMENT USING CLUSTERED LDAP SERVERS

(75) Inventors: Chandrajit G. Joshi, Pune (IN); Romil J. Shah, Pune (IN)

(73) Assignee: International Business Machines Corporation, Armonk, NY (US)

(*) Notice: Subject to any disclaimer, the term of this patent is extended or adjusted under 35 U.S.C. 154(b) by 153 days.

(21) Appl. No.: 12/493,409

(22) Filed: Jun. 29, 2009

(65) Prior Publication Data

US 2010/0332532 A1 Dec. 30, 2010

(51) Int. Cl.
G06F 17/30 (2006.01)
H04L 29/08 (2006.01)
G06F 9/50 (2006.01)

(52) U.S. Cl.
CPC ........ *G06F 17/30589* (2013.01); *G06F 9/5083* (2013.01); *H04L 67/1042* (2013.01)

(58) Field of Classification Search
CPC ............ G06F 9/5083; G06F 111/0709; G06F 111/3006; G06F 17/30283; H04L 67/1042
USPC .................. 707/609, 770, 953, 966, E17.032, 707/999.01
See application file for complete search history.

(56) References Cited

U.S. PATENT DOCUMENTS

| | | | |
|---|---|---|---|
| 6,714,930 B1 | 3/2004 | Garrison et al. | |
| 7,051,114 B1* | 5/2006 | Ravishankar et al. | 709/245 |
| 7,617,257 B2* | 11/2009 | Sathyanarayan et al. | |
| 7,954,144 B1* | 5/2011 | Ebrahimi et al. | 726/12 |
| 8,316,104 B2* | 11/2012 | Galvez | C07K 16/286 |
| | | | 702/204 |
| 2002/0062375 A1* | 5/2002 | Teodosiu | H04L 29/06 |
| | | | 709/226 |
| 2002/0082821 A1* | 6/2002 | Ferguson et al. | 703/22 |
| 2002/0087718 A1* | 7/2002 | Hill et al. | 709/237 |
| 2004/0039820 A1* | 2/2004 | Colby | H04L 12/5695 |
| | | | 709/226 |
| 2004/0117350 A1 | 6/2004 | Cavage et al. | |
| 2005/0160133 A1* | 7/2005 | Greenlee et al. | 709/200 |
| 2006/0020586 A1 | 1/2006 | Prompt et al. | |
| 2006/0179150 A1* | 8/2006 | Farley et al. | 709/228 |
| 2007/0214209 A1* | 9/2007 | Maeda | 709/202 |
| 2008/0040550 A1 | 2/2008 | Lindner | |
| 2009/0265467 A1* | 10/2009 | Peles | 709/226 |

OTHER PUBLICATIONS iSeries Information Center, Suffix(naming context), loc: http://publib.boulder.ibm.com/infocenter/iseries/v5r3/index.jsp?topic=%2Frzahy%2Frzahysuffix.htm.*

* cited by examiner

*Primary Examiner* — Miranda Huang

(74) *Attorney, Agent, or Firm* — Brevetto Law Group

(57) ABSTRACT

The clustering of LDAP servers wherein each LDAP server is connected to the databases of all other LDAP servers in addition to its own database. This creates a mesh of highly available LDAP servers that are loosely connected to all the repositories of LDAP data in the distributed directory environment. Also broadly contemplated herein is the employment of a cluster manager for managing the cluster of LDAP servers.

19 Claims, 5 Drawing Sheets

FIG. 1 – Data Processing System

FIG. 2 – Distributed Directory

FIG. 3 – Clustering of LDAP Servers

~400

| Subtree DN | LDAP Server |
|---|---|
| O=IBM,C=US | SERVER1 |
| O=IBM,C=IN | SERVER2 |
| CN=SAMPLE | SERVER3 |
| CN=TEST | SERVER1 |
| ... | ... |

FIG. 4

DISTRIBUTED DIRECTORY ENVIRONMENT USING CLUSTERED LDAP SERVERS

TRADEMARKS

IBM® is a registered trademark of International Business Machines Corporation, Armonk, N.Y., U.S.A. Other names used herein may be registered trademarks, trademarks or product names of International Business Machines Corporation or other companies. Microsoft® is a registered trademark of Microsoft Corporation. Java® is a registered trademark of Sun Microsystems.

BACKGROUND

Conventional distributed directory environments having homogeneous, standalone LDAP (Lightweight Directory Access Protocol) servers (Server1, Server2 . . . ), as illustrated in FIG. 2, have different LDAP subtrees, while each server preferably has its own database (DB). LDAP clients (Client1, Client2) communicate to these servers through LDAP proxy servers (Proxy1, Proxy2). Depending oil the client request, a proxy server selects an appropriate LDAP server to route the request. LDAP server processes any requests made and sends a reply back to the client through the LDAP proxy. Multiple proxy servers can be configured to achieve failover and load balancing in the proxy servers. However, disadvantages have arisen through such an arrangement.

Since most of the LDAP servers arc stand-alone, replication needs to be setup in order to ensure a high availability of data; thus, in the event of failure of any LDAP server, all requests intended for the failed LDAP server can be routed to a replica (replicated) server. However, if the load on a LDAP server is relatively high, then the load cannot be distributed elsewhere since each LDAP server will be tightly coupled with its own database.

On the other hand, adding more LDAP servers can cause disadvantages relating to complexity of the network. Particularly, if more LDAP servers are added in the distributed directory, then in order for a proxy to be aware of the new servers added to the network, additional configurations needs to be undertaken in the proxy and it may be necessary at this time for the proxy to be restarted. For distributing client load amongst the proxy servers, if new proxy servers are added, they need a great deal of configuration to be undertaken every time that proxy servers are added increasing operational, computational, resource and other costs, and causing immense waste of resources.

SUMMARY

In accordance with at least one embodiment of the invention, is disclosed the clustering of LDAP servers where each LDAP server is connected to the databases of all other LDAP servers in addition to its own database. This creates a mesh of highly available LDAP servers that are loosely coupled to all the repositories of LDAP data in the distributed directory environment. Also disclosed is the employment of a cluster manager for managing the cluster of LDAP servers.

Embodiments of the invention describe a method including providing a LDAP server cluster, the LDAP server cluster comprising a plurality of LDAP servers, providing databases respectively associated with each of the LDAP servers, connecting each LDAP server with all of the databases, and providing a cluster manager which manages the LDAP server cluster. Other embodiments are also disclosed.

Additionally, this embodiments of the invention describes an apparatus such as a physical computing device, the physical computing device having a main memory and a manager in communication with the main memory; the manager configured to connect with a LDAP server cluster, the LDAP server cluster having a plurality of LDAP servers; access databases respectively associated with each of the LDAP servers, each LDAP server being in communication with all of the databases; and a connection medium which interconnects each LDAP server with all of the databases; and the manager further comprising a cluster manager which manages the LDAP server cluster.

Furthermore, embodiments of the invention also describes a program storage device readable by machine, tangibly embodying a program of instructions executable by the machine to perform providing a LDAP server cluster, the LDAP server cluster comprising a plurality of LDAP servers; providing databases respectively associated with each of the LDAP servers; connecting each LDAP server with all of the databases; and providing a cluster manager which manages the LDAP server cluster.

BRIEF DESCRIPTION OF THE DRAWINGS

FIG. 4 provides an exemplary embodiment of a table of suffix-to-server mapping.

DETAILED DESCRIPTION

It may be readily understood by one skilled in the art that the embodiments of the invention, as generally described and illustrated in the Figures herein, may be arranged and designed in a wide variety of different configurations. The detailed description of the embodiments of the invention with respect to an apparatus, system, and method are represented in FIGS. 1, and 3-5, which are not intended to limit the scope of embodiments of the invention, as claimed, but is merely representative of selected and exemplary embodiments of the invention.

Reference made throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" in various places throughout this specification are not necessarily all referring to the same embodiment.

Furthermore, the features described, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of the embodiments of the invention. One skilled in the art will easily recognize, however, that embodiment of the invention can be practiced without one or more of the specific details, or with other methods, components, materials, etc. In other instances, well-known structures, materials, or operations are not shown or described in detail to avoid obscuring aspects of embodiments of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes, and does not limit the scope of the embodiments of the invention disclosed herein.

Figure 1:
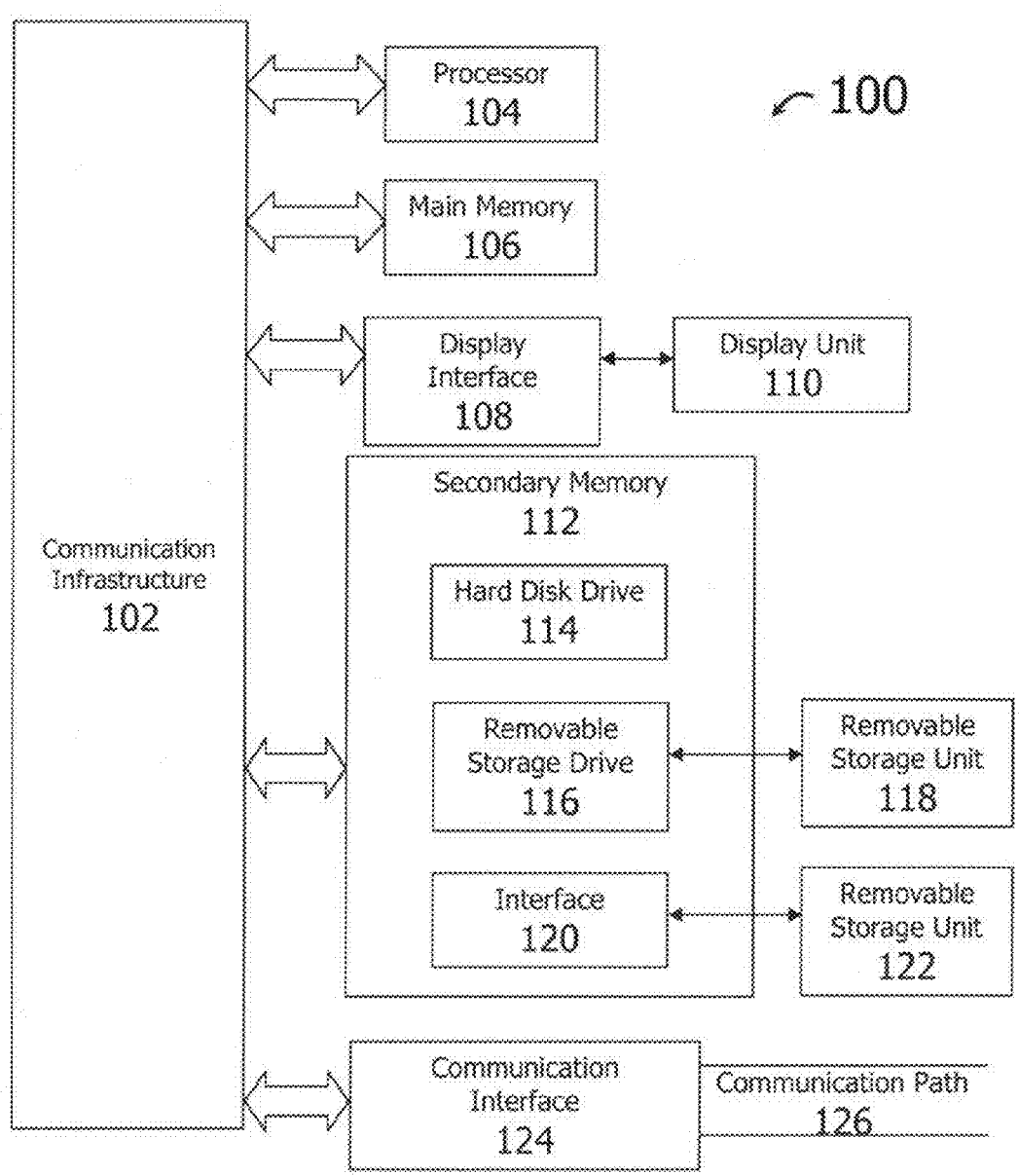
FIG. 1 schematically illustrates an exemplary embodiment of a computer system.

Reference is now made to FIG. 1 is a block diagram of an exemplary data processing system 100, for example a computing system such as a desktop computer, laptop computer, PDA, mobile phone and the likes, that can be used for implementing exemplary embodiments of the present invention. Data processing system 100 includes one or more processors, for example processor 104 as illustrated in FIG. 1. Processor 104 is coupled to a communication infrastructure 102 (for example, a communications bus, cross-over bar, or network). Various software embodiments are described in terms of this exemplary data processing system. After reading this description, it will become apparent to a person of ordinary skill in the relevant art(s) how to implement the invention using other data processing systems and/or computer architectures.

Exemplary data processing system 100 can include display interface 108 that forwards graphics, text, and other data from the communication infrastructure 102 (or from a frame buffer not shown) for display on display unit 110. Data processing system 100 also includes main memory 106, which can be random access memory (RAM), and may also include secondary memory 112. Secondary memory 112 may include, for example, hard disk drive 114 and/or removable storage drive 116, representing a floppy disk drive, a magnetic tape drive, an optical disk drive, etc. Removable storage drive 116 reads from and/or writes to removable storage unit 118 in a manner well known to those having ordinary skill in the art. Removable storage unit 118, represents, for example, a floppy disk, magnetic tape, optical disk, etc. which is read by and written to by removable storage drive 116. As will be appreciated, removable storage unit 118 includes a computer usable storage medium having stored therein computer software and/or data.

In exemplary embodiments, secondary memory 112 may include other similar means for allowing computer programs or other instructions to be loaded into the computer system. Such means may include, for example, removable storage unit 122 and interface 120. Examples of such may include a program cartridge and cartridge interface (such as that found in video game devices), a removable memory chip (such as an EPROM, or PROM) and associated socket, and other removable storage units 122 and interfaces 120 which allow software and data to be transferred from removable storage unit 122 to data processing system 100.

Data processing system 100 may also include a communications interface 124. Communications interface 124 allows software and data to be transferred between the data processing system and any other external devices. Examples of communications interface 124 may include a modem, a network interface (such as an Ethernet card), a communications port, a PCMCIA slot and card, etc. Software and data transferred via communications interface 124 are typically in the form of signals which may be, for example, electronic, electromagnetic, optical, or other signals capable of being received by communications interface 124. These signals are provided to communications interface 124 via communications path (that is, channel) 126. Channel 126 carries signals and may be implemented using wire or cable, fiber optics, a phone line, a cellular phone link, an RF link, and/or other communications channels.

The terms "computer program medium," "computer usable medium," and "computer readable medium" are used to generally refer to media such as main memory 106 and secondary memory 112, removable storage drive 116, a hard disk installed in hard disk drive 114, and signals thereof Computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, which allows a computer to read such computer readable information.

Computer programs (also called computer control logic) are typically stored in main memory 106 and/or secondary memory 112. Computer programs may also be received via communications interface 124. Such computer programs, when executed, can enable the computer system to perform the features of exemplary embodiments of the invention as discussed herein. In particular, computer programs, when executed, enable processor 104 to perform the features of data processing system 600. Accordingly, such computer programs represent controllers of the data processing system.

Figure 3:
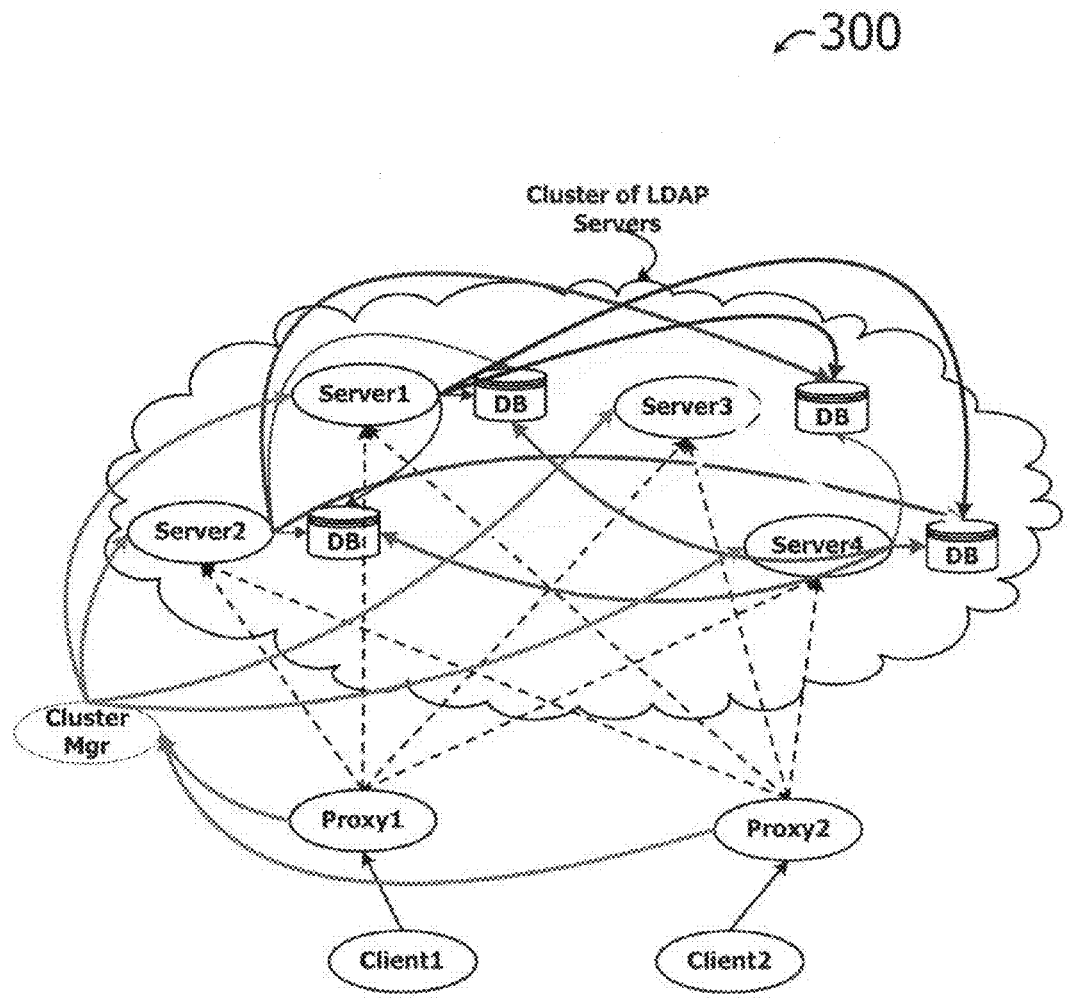
FIG. 3 schematically illustrates an exemplary embodiment of a clustered distributed directory environment.
Figure 5:
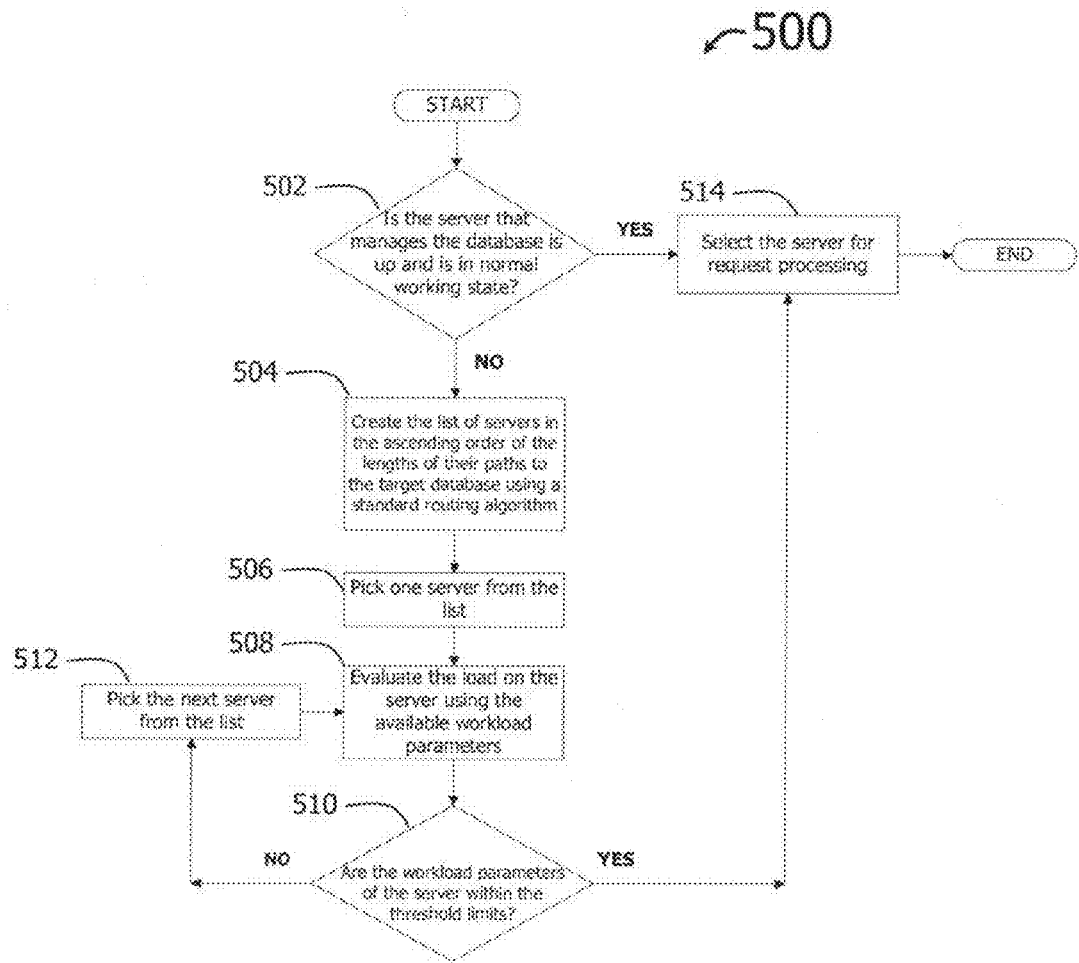
FIG. 5 provides an exemplary embodiment of a flowchart of a process for selecting a LDAP server by a proxy for search request processing.

Reference may now be made to FIGS. 3-5 by way of discussing exemplary embodiments of the invention. It should be understood that the arrangements broadly contemplated in accordance with FIGS. 3-5 can be applied to a very wide range of computer systems, including the computer system/data processing system 100 indicated in FIG. 1. Thus, a computer system 12 could be connected with any LDAP server as discussed herein.

Figure 2:
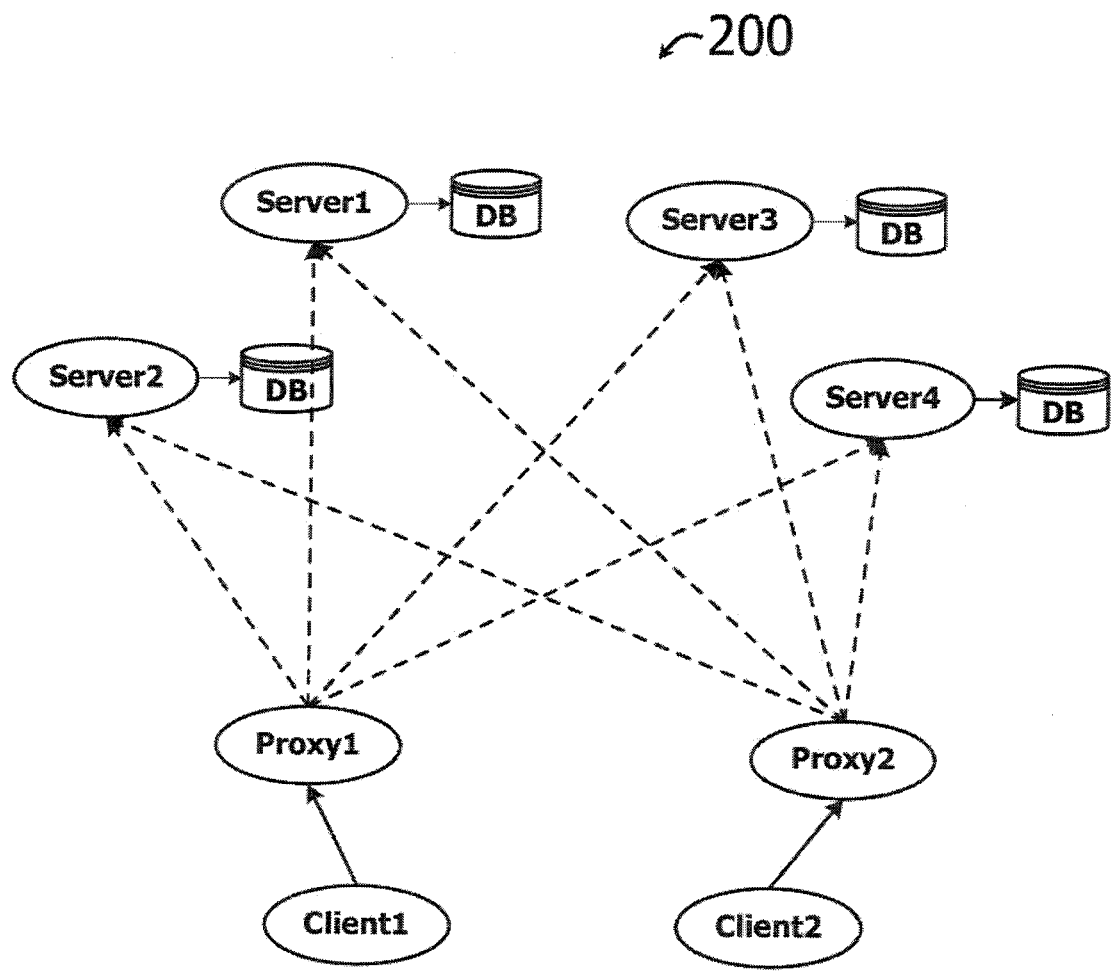
FIG. 2 schematically illustrates a conventional distributed directory environment.

As discussed previously, a conventional distributed directory environment 200 is schematically illustrated in FIG. 2. In contrast, FIG. 3 essentially illustrates the same environment as illustrated in FIG. 2, but involves a clustered arrangement 300 (defined within the "cloud" shown) of LDAP servers. As shown in FIG. 3, in accordance with an exemplary embodiment of the invention, each LDAP server can be connected to the databases of all other LDAP servers in addition to its own database, while the cluster manager includes persistent connections to all the LDAP servers. The cluster manager maintains configuration information about all the LDAP and proxy servers. At regular intervals of time, the cluster manager may be configured to collect the status and other required statistical information of the LDAP servers. All the proxy servers may maintain persistent connections with the cluster manager to request for the status, statistics and configuration information of the LDAP servers. When clients send requests to the proxy servers, based on this information, the proxy server can select an appropriate LDAP server for request processing. This selection can be based on a set of predetermined criteria, as will be discussed below.

It should be appreciated that since all the LDAP servers are connected all the repositories of LDAP data, in case of a failure of a LDAP server, the proxy can route the request to any other server to fetch the data. Hence, a high availability of data is achieved without replication.

Further, since proxy servers have status and other statistical information about all the LDAP servers, the proxy servers may be aware of the exact state of the LDAP servers. Based on this information, the proxy servers may select an appropriate LDAP server for request processing to achieve load balancing. Despite this, if a LDAP server goes into an error state because of either too much load or a failure, the proxy server can still route the request to any other server at that point.

Additional LDAP servers can be added to the cluster by notifying the cluster manager, so that the cluster manager may get the configuration information about it and broadcast it to all other servers. This is needed so that all the servers can establish connections to the database of the newly added server.

Also, when the proxy servers send a request for the status, statistics and configuration information of the LDAP servers to the cluster manager, the cluster manager sends the information about the newly added server in the cluster as well. This causes the proxy servers to become aware about the new server in the cluster and route the any requests to it if it is selected to service the request. In short, there is enabled, in accordance with embodiments of the invention, the online addition of LDAP servers in the distributed directory environment.

Generally, proxy servers do not have to maintain any configuration information about any of the LDAP servers. Proxy servers obtain information along with the status and statistics information, when they send the request to the cluster manager at regular intervals. Hence new proxy servers can be easily added with minimal configuration.

Turnaround time for client requests is reduced in the event of failures of LDAP servers because proxy servers maintain the state information of LDAP servers. Hence, requests can still be processed since a proxy server can select another LDAP processor to respond to a request.

In accordance with an embodiment of the invention, a cluster can be configured as follows: First, the cluster manager should be configured and started. Thence, all the LDAP servers should be configured and started. The configuration of each LDAP server should contain the information about the cluster manager so that they can connect/communicate to the cluster manager and send their own configuration information to the cluster manager. In short, each LDAP server needs to register itself with the cluster manager during startup. The configuration information of the cluster manager may contain, but not be limited to, a LDAP URL of the cluster manager in the form of ldap://<hostname or IP address>:<port no.>.

The configuration information of the LDAP servers that will be sent to the cluster manager may contain, but not be limited to, a LDAP URL of the LDAP server in the form of ldap://<hostname or IP address>:<port no.>. Configuration may also contain suffixes maintained by the server (for example, "O=IBM,C=US", "O=IBM,C=IN", etc.) as well as credential information for connecting to the database. The credential information may be sent to all other LDAP servers by the cluster manager so that the LDAP servers can connect to the database. Such information may include, while not being limited to: a database instance name, a database user name and a database user password.

The cluster manager may add the configuration information of LDAP servers into its configuration file. This is because, in case of a failure of the cluster manager, the cluster manager should be able to retrieve such information from the configuration file without any need to send any additional requests to the LDAP server after restarting.

The cluster manager may also establish connections with all the LDAP servers using the configuration information of the LDAP servers; and send requests for the LDAP servers' status and statistical information at regular intervals of time. The LDAP servers response to such requests may include, while not being limited to, requesting the following: whether the LDAP server is in a normal state (e.g., a request processing state); current workload parameters (e.g., maximum number of allowable connections, total number of active connections, total number of requests "in process" (i.e., currently in process), total number of pending requests, total number of requests including both "in process" and pending requests).

Turning to particularities of the proxy servers in accordance with embodiments of the invention, configuration files of all the proxy servers should include the configuration information of the cluster manager. The information can be same as mentioned above with respect to the cluster manager. When a proxy server is started, it may establish a connection with the cluster manager and start sending requests for status, statistics and configuration information of the LDAP server to the cluster manager at regular intervals of time.

The cluster manager's response to these requests can include information about all the LDAP servers in the cluster, and may include configuration information of LDAP server; such information can include, for example, whether the LDAP server is in a normal state (for example, a request processing state); current workload parameters.

From the information received from the cluster manager, the proxy server may create a table of suffix-to-server mapping. The table 400 may be configured as shown in FIG. 4. As shown, each entry in the table indicates which LDAP suffix resides in which server's database. As mentioned above, the proxy server can make use of the information received from the cluster manager to select appropriate LDAP server for request processing.

An exemplary set of criteria that can be applied for this selection is given below. Upon receiving a client request, determine from the suffix-to-database mapping table (FIG. 4), which database has the data for which the request is related. For example, if the client request contains DN as CN=TEST,O=IBM,C=US, and the mapping table shows that the "O=IBM,C=US" suffix is with Server1, then this indicates that the data is in the database of Server1.

If the client request is a database change request, for example a LDAP ADD, MODIFY, DELETE or MODRDN, then the proxy server will send such a request to the LDAP server that is tightly coupled to that database. For example, if data to be updated is in the database of Server1, then the request will always be sent to Server1. If that LDAP server is not available or is not in a position to serve the request, then an error is reported to the client. Therefore, in the example mentioned above, if Server1 is not in a state to serve the request, then return "error".

If the client request is a LDAP SEARCH request, then execute a method for selecting a LDAP server as has been illustrated in FIG. 5. This method should be completely based on the information received from the cluster manager. From the status information received from the cluster manager, Check (502) whether the server that is managing the database is up and running in the normal request processing mode and the workload parameters are within the maximum threshold limits. If yes, then select the server for request processing (514).

Otherwise, the proxy server creates a list of LDAP servers in the ascending order of their paths to the database (504). For example, if such a list includes three servers (e.g., Server1, Server2 and Server3), then this indicates that Server1 has the shortest path to the target database, Server2 has the second shortest path, and so on. The shortest path to the target database, for its part, can be determined using any standard routing and selection techniques that are known in the art.

It should be noted that the in one embodiment the method may be configured to select the shortest path based on the IP addresses of the LDAP servers. Further, the method could select more than one equivalent shortest path. For example, if there are five LDAP servers in the cluster (Server1, Server2, Server3, Server4 and Server5), and three (Server1, Server2 and Server3) are configured on the same system, then it any data needed by the client is in the database of Server1 at the same time that Server1 is not available, then the method can select two equal shortest paths to the database of Server1, i.e., Server2 and Server3, because both of them will be in equal physical proximity to Server1.

To select a server from the list (506), the method can apply the "least busy server" criteria and the maximum workload thresholds on each of these servers based on their workload parameters available with the proxy. The load on the server should be evaluated (508). If a server has the shortest path to the target database but is having workload parameters beyond the threshold limits (510, 512), then the server should not considered for the request processing and another server should be selected (512, 508).

Once a server is selected for request processing (514), the client request is sent to the selected LDAP server. Also, the suffix-to-server mapping can be sent along with the client request so that the selected server knows which database has the requested data.

It is to be understood that in accordance with at least one embodiment, is included elements that may be implemented on at least one general-purpose computer running suitable software programs. These may also be implemented on at least one Integrated Circuit or part of at least one Integrated Circuit. Thus, it is to be understood that embodiments of the invention may be implemented in hardware, software, or a combination of both thereof.

Generally, embodiments may take the form of an entirely hardware embodiment, an entirely software embodiment or an embodiment containing both hardware and software elements. An embodiment that is implemented in software may include, but is not limited to, firmware, resident software, microcode, etc.

Furthermore, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system or apparatus or device or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices including but not limited to keyboards, displays, pointing devices, etc. can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Embodiments of the invention have been presented for purposes of illustration and description but are not intended to be exhaustive or limiting. Various other modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Generally, although illustrative embodiments of the invention have been described herein with reference to the accompanying drawings, it is to be understood that the invention is not limited to those precise embodiments.

What is claimed is:

1. A method for managing a lightweight directory access protocol (LDAP) server in an LDAP server cluster, the method comprising:

providing a cluster manager in the LDAP server cluster comprising a plurality of LDAP servers including a first LDAP server tightly coupled to a first database and a second LDAP server tightly coupled to a second database, wherein the cluster manager is configured to manage the LDAP server cluster, said cluster manager being configured to maintain status information for each of the plurality of LDAP servers;

maintaining a proximity list for the plurality of LDAP servers in ascending order of path length from the first database tightly coupled with said first LDAP server;

providing a connection between a proxy server and said cluster manager, and configuring the proxy server to obtain said status information from the cluster manager;

configuring the proxy server to process requests for the LDAP server cluster, wherein the proxy server is communicatively coupled with a client;

receiving, at the proxy server, a client request for data from the first database;

determining from said status information that the first LDAP server is not in a normal working state; and selecting, by the proxy server, the second LDAP server from the LDAP server cluster to execute the client request based on said status information received from the cluster manager indicating that the first LDAP server is not in the normal working state and the proximity list;

wherein each LDAP server among the plurality of LDAP servers is at least loosely coupled with each of the plurality of databases, and is tightly coupled with a respective one of the plurality of databases. and wherein a suffix-to-database mapping table is employed to execute the client request.

2. The method of claim 1, further comprising configuring each of the plurality of LDAP servers with a configuration information of the cluster manager.

3. The method of claim 1, further comprising configuring the cluster manager with configuration information of the plurality of LDAP servers in the LDAP server cluster.

4. The method of claim 1, further comprising;

polling each of the plurality of LDAP servers at predetermined intervals for status updates; and updating the cluster manager if there are any current status updates that are different from any previous updates in the cluster manager;

wherein the second LDAP server is determined to be most proximate among the plurality of LDAP servers in the normal working state.

5. The method of claim 4, wherein the cluster manager is configured to poll each of the plurality of LDAP servers.

6. The method of claim 1, wherein the proxy server is configured to process an LDAP search request, and choosing an LDAP server is based on criteria including proximity to an LDAP database and workload parameters.

7. An apparatus comprising:

a physical computing device comprising a main memory and a cluster manager in communication with the main memory;

an LDAP server cluster comprising a plurality of LDAP servers including a first LDAP server tightly coupled to a first database and a second LDAP server tightly coupled to a second database, wherein the cluster manager is configured to manage the plurality of LDAP servers in the LDAP server cluster, said cluster manager being configured to maintain status information for each of the plurality of LDAP servers;

a storage unit that stores a proximity list for the plurality of LDAP servers in ascending order of path length from the first database tightly coupled with said first LDAP server;

a proxy server configured to obtain said status information from the cluster manager, the status information indicating that the first LDAP server is not in a normal working state;

a connection between the proxy server and said cluster manager, said connection being configured for the proxy server to obtain said status information from the cluster manager;

a connection medium which interconnects each of the plurality of LDAP servers with all of a plurality of databases, each of which is respectively associated with one of the plurality of LDAP servers, and wherein the cluster manager is configured to access each of said plurality of databases; and network means connecting the proxy server with a client;

wherein the cluster manager is configured to access the proxy server and employ the proxy server to process client requests for the plurality of LDAP servers;

wherein the proxy server is configured to choose the second LDAP server from the LDAP server cluster to execute a client request for data from the first database based on said status information received from the cluster manager indicating that the first LDAP server is not in the normal working state and the proximity list; and wherein each LDAP server among the plurality of LDAP servers is at least loosely coupled with each of the plurality of databases, and is tightly coupled with a respective one of the plurality of databases; and wherein the cluster manager is configured to choose an LDAP server via employing a suffix-to-database mapping table.

8. The apparatus of claim 7, wherein the cluster manager is coupled with the LDAP server cluster.

9. The apparatus of claim 8, wherein said each of the plurality of LDAP servers is in communication with all of the databases.

10. The apparatus of claim 7, wherein the cluster manager is arranged to perform at least one of configuring each of the plurality of LDAP servers with configuration information of the cluster manager, and configuring the cluster manager with configuration information of the plurality of LDAP servers, and configured to poll each of the plurality of LDAP servers at predetermined intervals for status updates; and wherein the second LDAP server is determined to be most proximate among the plurality of LDAP servers in the normal working state.

11. The apparatus of claim 7, wherein the cluster manager is configured to access the proxy server which is coupled to the client, the cluster manager being configured to receive the client request via the proxy server.

12. The apparatus of claim 11, wherein the cluster manager is configured to employ the proxy server to choose an LDAP server from the LDAP server cluster to perform the client request.

13. The apparatus of claim 12, wherein the cluster manager is configured to employ the proxy server via processing an LDAP search request and choose an LDAP server based on criteria including proximity to an LDAP database and workload parameters.

14. A program storage device readable by machine, tangibly embodying a program of instructions executable by the machine to perform a method for managing a lightweight directory access protocol (LDAP) server in an LDAP server cluster, the method comprising:

providing a cluster manager in the LDAP server cluster comprising a plurality of LDAP servers including a first LDAP server tightly coupled to a first database and a second LDAP server tightly coupled to a second database, wherein the cluster manager is configured to manage the LDAP server cluster, said cluster manager being configured to maintain status information for each of the plurality of LDAP servers;

maintaining a proximity list for the plurality of LDAP servers in ascending order of path length from the first database tightly coupled with said first LDAP server;

providing a connection between a proxy server and said cluster manager, and configuring the proxy server to obtain said status information from the cluster manager;

providing databases respectively associated with each of the plurality of LDAP servers;

connecting each of the plurality of LDAP servers with all of said databases;

configuring the proxy server to process requests for the LDAP server cluster, wherein the proxy server is communicatively coupled with a client;

receiving, at the proxy server, a client request for data from the first database;

determining from said status information that the first LDAP server is not in a normal working state; and selecting, by the proxy server, the second LDAP server from the LDAP server cluster to execute the client request based on said status information received from the cluster manager received from the cluster manager and said proximity list;

wherein each LDAP server among the plurality of LDAP servers is at least loosely coupled with each of the plurality of databases, and is tightly coupled with a respective one of the plurality of databases; and wherein the second LDAP server is determined to be most proximate among the plurality of LDAP servers in the normal working state; and wherein a suffix-to-database mapping table is employed to execute the client request.

15. A method of managing an LDAP server cluster comprising a cluster manager connected to each of a plurality of LDAP servers, the method comprising:

connecting each of the plurality of LDAP servers to all databases in a plurality of databases, wherein a first LDAP server among the plurality of LDAP servers is tightly coupled to a first database among the plurality of databases and a second LDAP server among the plurality of LDAP servers is tightly coupled to a second database among the plurality of databases;

maintaining a proximity list for the plurality of LDAP servers in ascending order of path length from the first database tightly coupled with said first LDAP server;

configuring the cluster manager to receive status information about each of the plurality of LDAP servers in the LDAP server cluster;

receiving at a proxy server a client request concerning data in the first database;

providing server status information for the first LDAP server and the second LDAP server from the cluster manager to the proxy server, wherein the server status information indicates that the first is not in a normal working state; and selecting, by the proxy server, the second LDAP server from among the plurality of LDAP servers to execute the client request based on the server status information indicating that the first LDAP server is not in the normal working state and the proximity list. and wherein a suffix-to-database mapping table is employed to execute the client request.

16. The method of claim 15, further comprising:

sending a server status request from the proxy server to the cluster manager in response to receiving the client request; and responding to the status request by returning the server status information from the cluster manager to the proxy serverz wherein the second LDAP server is determined to be most proximate among the plurality of LDAP servers in the normal working state.

17. The method of claim 15, wherein, if the client request is a database change request then the server status information includes status information for at least the first LDAP server.

18. The method of claim 15, wherein, if the client request is not a database change request then the server status information includes status information for each of the plurality of LDAP servers in the LDAP server cluster.

19. The method of claim 15, wherein said client request is a first client request and said proxy server is a first proxy server, the method further comprising:

receiving at a second proxy server a second client request concerning data in a second database;

sending a server status request from the second proxy server to the cluster manager in response to receiving the second client request; and responding to the second status request by returning status information for a second LDAP server from the cluster manager to the second proxy server.

* * * * *